(12) United States Patent
Singh (10) Patent No.: US 12,513,127 B2
(45) Date of Patent: Dec. 30, 2025

(54) END TO END ENCRYPTION OF DATA IN AN ELECTRONIC MONITORING SYSTEM

(71) Applicant: Arlo Technologies, Inc., Carlsbad, CA (US)

(72) Inventor: Rajinder Singh, San Jose, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 250 days.

(21) Appl. No.: 18/211,115

(22) Filed: Jun. 16, 2023

(65) Prior Publication Data

US 2024/0422143 A1 Dec. 19, 2024

(51) Int. Cl.
*H04L 9/40* (2022.01)
(52) U.S. Cl.
CPC .................. *H04L 63/0485* (2013.01)
(58) Field of Classification Search
CPC .................................... H04L 63/0485
USPC ........................................ 713/160
See application file for complete search history.

(56) References Cited

U.S. PATENT DOCUMENTS

| | | | |
|---|---|---|---|
| 11,863,908 B2* | 1/2024 | An | H04N 21/23418 |
| 2015/0030155 A1* | 1/2015 | Park | H04N 7/183 380/210 |
| 2017/0359724 A1 | 12/2017 | Katsman et al. | |
| 2022/0083676 A1* | 3/2022 | San Pedro | G06V 20/52 |

FOREIGN PATENT DOCUMENTS

WO 2017083980 A1 5/2017

* cited by examiner

*Primary Examiner* — Michael S McNally
(74) *Attorney, Agent, or Firm* — Boyle Fredrickson, S.C.

(57) ABSTRACT

An electronic monitoring system and a method of monitoring an activity zone are provided. A monitor monitors for an activity within an activity zone. The monitor is configured to generate a data packet corresponding to the activity. The data packet is transmitted to a control system that may be cloud-based, and the data packet is stored in computer-readable memory associated with the control system. The data packet is encrypted utilizing a public key prior to storage in computer-readable memory. The encrypted data packet may be decrypted on a user device using a private key.

17 Claims, 7 Drawing Sheets

END TO END ENCRYPTION OF DATA IN AN ELECTRONIC MONITORING SYSTEM

FIELD OF THE INVENTION

The present invention relates generally to networked electronic monitoring systems, and in particular, to an electronic monitoring system and method of end to end encryption of data transmitted in an electronic monitoring system.

BACKGROUND AND SUMMARY OF THE INVENTION

Modern electronic monitoring systems for the home and other premises include various components including video and audio communication technology. For example, the typical electronic monitoring system includes imaging devices or cameras directed at various activity zones to be monitored for the simultaneous video and audio communication to a user on a computing device; one or more sensors configured to detect one or more types of conditions or stimulus, for example, motion, opening or closing events of doors or windows, the presence of smoke, carbon monoxide, water leaks, and temperature changes; and/or one or more audio devices such as microphones, sound sensors, and speakers configured for audio communication or providing audible alerts. Upon detection of an activity, such as sound or motion, in an activity zone or upon a captured image of an activity zone matching a predetermined image, the electronic monitoring system triggers an alert which is transmitted to a user device over a communications network to notify the user of the detected activity. The user device typically is a smart phone, a tablet, or a personal computer.

It can be appreciated that many of components of the electronic monitoring system must have considerable processing capability for performing processing operations ranging from simple filtering operations to more complex operations such as facial recognition or other classification operations. When performed by a component of the electronic monitoring system, these processing operations are sometimes referred to as "edge processing" operations because they are permed by "edge devices" of a system rather than by a central processor such as a cloud-based processor. The electronic monitoring system typically further includes a hub or base station to communicate with the various components of the system and with an external server, such as a cloud-based server. In addition, the hub or base station may also communicate with one or more user devices. The hub or base station may be a dedicated device or integrated into another device such as a gateway router.

It can be understood that the imaging devices, security cameras, sensors, microprocessors, and communication systems of the electronic monitoring system must all work together to insure the proper functioning of the system. Data must be digitized, recorded, relayed, processed, analyzed, and shared among the various components of the system. Hence, trustworthy communication of data between the various components of the electronic monitoring system is essential for the proper operation of the system. Further, maintaining the security and integrity of these communications is required to protect the data and the various systems and components from digital attacks.

While electronic monitoring systems are dependent upon the security and integrity of the data flowing between the various components thereof, the data can be vulnerable to weakness and exploitation. More specifically, the data may be subjected to a random and accidental occurrence or may be subjected to a targeted and deliberate attack. For example, targeted attacks on the cloud based server, the Internet of Things (IoT), and/or the various components of the electronic monitoring system may occur. The potential for harm to the data, and hence the electronic monitoring system itself, can vary significantly depending on the occurrence or attack.

Therefore, it is a primary object and feature of the present invention to provide a system and method of end to end encryption of data transmitted in an electronic monitoring system which maintains the security and integrity of the data transmitted within the electronic monitoring system.

It is a further object and feature of the present invention to provide a system and method of end to end encryption of data transmitted in an electronic monitoring system which mitigates risks to the electronic monitoring system from random and accidental occurrences and/or targeted and deliberate digital attacks.

It is a further object and feature of the present invention to provide a system and method of end to end encryption of data transmitted in an electronic monitoring system which is simple and inexpensive to implement.

SUMMARY OF THE INVENTION

In accordance with the present invention, an electronic monitoring system is provided. The electronic monitoring system includes a monitor for monitoring an activity within an activity zone. The monitor is configured to generate a data packet corresponding to the activity. An encryption processor in communication with the monitor is configured to encrypt the data packet using a public key. Computer-readable memory is provided for storing the encrypted data packet. A user device is communicable with the computer-readable memory. The user device stores a private key and includes a decryption processor configured to receive the encrypted data packet from the computer-readable memory and to decrypt the encrypted data packet using the private key.

The monitor may take the form of a detector for detecting the activity in the activity zone. The detector generates the data packet in response to detection of the activity in the activity zone and is configured to generate an alert signal in response to the activity detected within the activity zone. By way of example, the detector may include an imaging device having a field of view in the activity zone. It is intended for the imaging device to capture an image of the field of view in response to the activity detected. The image is comprised of a plurality of frames defining the data packet. The data packet may be a first data packet, and each frame of the plurality of frames of the image may define a corresponding data packet so as to define a plurality of data packets. Alternatively, the plurality of the frames may define an event video, and the encryption processor may be configured to encrypt the event video using the public key.

The user device is communicable with the detector, and the detector transmits an alert signal to the user device in response to the detected activity. The user device may be a first user device, and the decryption processor may be a first decryption processor. The electronic monitoring system also may include a second user device having the private key and a second decryption processor configured to receive the encrypted data packet from the computer-readable memory and to decrypt the encrypted data packet using the private key.

In accordance with a further aspect of the present invention, an electronic monitoring system is provided. The electronic monitoring system includes a monitor for monitoring an activity within an activity zone. The monitor is configured to generate a data packet corresponding to the activity. The electronic monitoring system further includes a cloud-based control system and a hub communicable with the monitor and the cloud-based control system. The hub is configured to receive the data packet from the monitor and to transmit the data packet to the cloud-based control system. An encryption processor is configured to encrypt the data packet using a public key. Computer-readable memory is associated with the cloud-based control system and is configured to store the encrypted data packet. A user device is communicable with the cloud-based control system and is adapted to receive the encrypted data packet. The user device stores a private key and includes a decryption processor configured to decrypt the encrypted data packet using the private key.

The monitor may take the form of a detector for detecting the activity in the activity zone. The detector generates the data packet in response to detection of the activity in the activity zone and is configured to generate an alert signal in response to the activity detected within the activity zone. The detector may include an imaging device having a field of view in the activity zone and being configured to capture an image of the field of view in response to the activity detected. The image is comprised of a plurality of frames defining the data packet. The data packet may be a first data packet, and each frame of the plurality of frames of the image may define a corresponding data packet so as to define a plurality of data packets. Alternatively, the plurality of the frames may define an event video, and the encryption processor may be configured to encrypt the event video using the public key.

The user device is communicable with the detector, and the detector transmits an alert signal to the user device in response to the detected activity. The user device may be a first user device, and the decryption processor may be a first decryption processor. A second user device may also be provided. The second user device stores the private key and has a second decryption processor configured to receive the encrypted data packet from the computer-readable memory and to decrypt the encrypted data packet using the private key.

In accordance with a still further aspect of the present invention, a method of monitoring an activity zone is provided. The method includes the steps of monitoring for an activity within an activity zone and generating a data packet corresponding to the activity. The data packet is transmitted to a control system and stored in computer-readable memory associated with the control system. The control system may be a cloud-based control system. The data packet is encrypted utilizing a public key prior to storage in a computer-readable memory. The encrypted data packet may be decrypted on a user device using a private key.

The data packet is generated in response to detection of the activity in the activity zone and an alert signal is generated in response to detection of the activity within the activity zone. The alert signal is transmitted to the user device. The activity may be detected by an imaging device having a field of view in the activity zone. The imaging device is configured to capture an image of the field of view in response to the activity detected. The image is comprised of a plurality of frames defining the data packet. The data packet may be a first data packet, and each frame of the plurality of frames of the image may define a corresponding data packet so as to define a plurality of data packets. Alternatively, the plurality of the frames may define an event video, and the encryption processor may be configured to encrypt the event video using the public key. It is contemplated for the user device to be a first user device and for the encrypted data packet to be decrypted on a second user device using the private key.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION

Figure 1:
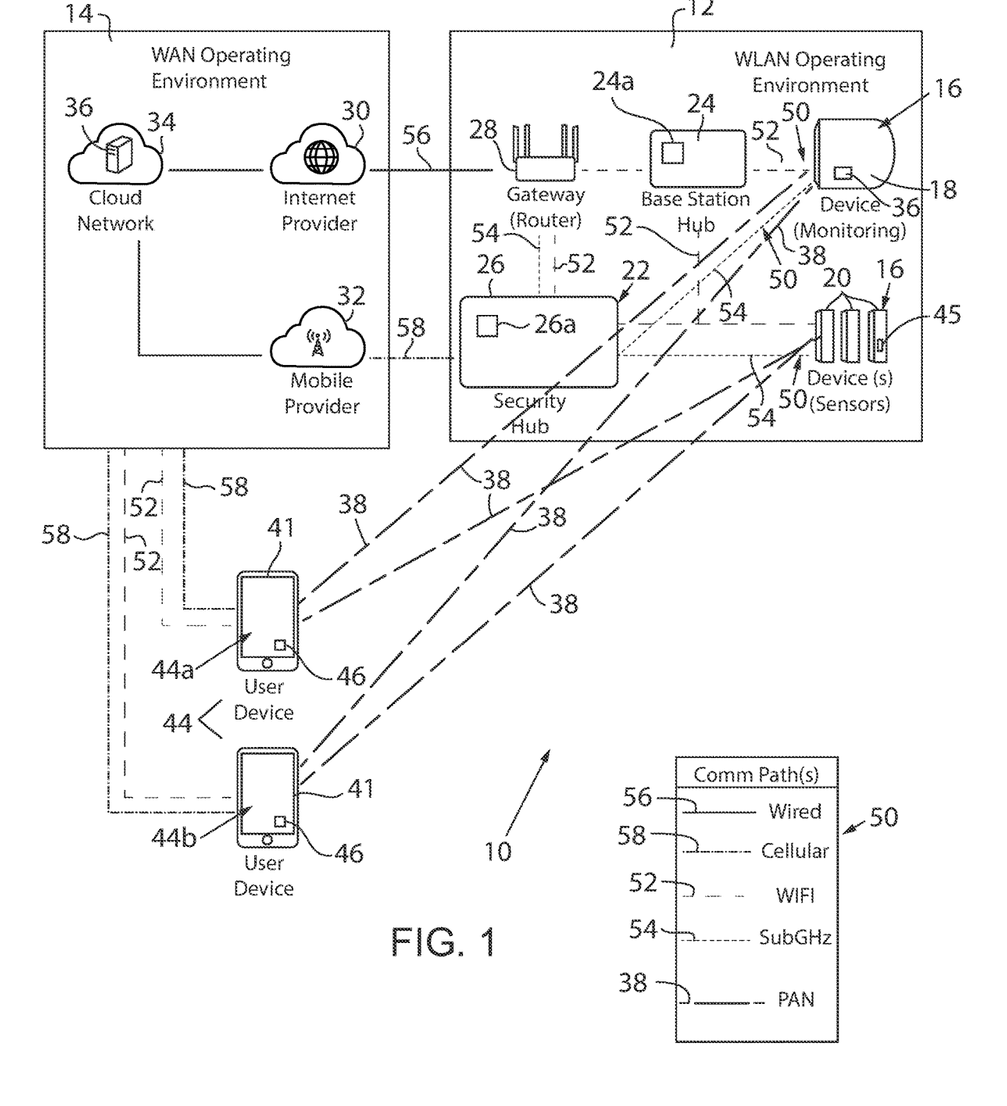
FIG. 1 is a schematic representation of an electronic monitoring system according to aspects of the invention.

Referring to FIG. 1, an electronic monitoring system 10 constructed in accordance with an aspect of the present invention is generally designated by the reference numeral 10. Electronic monitoring system 10 is implemented in a wireless communication operating environment. For example, wireless communication may be implemented by a WLAN (wireless local area network) operating environment (WLAN 12) or by direct Bluetooth® or any communications technology on a personal area network (PAN) between the various components of electronic monitoring system 10 and/or one or more user devices 44, as hereinafter described.

In the depicted embodiment, WLAN 12 is communicatively connected to a WAN (wide area network) operating environment, designated by the reference numeral 14. Within WLAN 12, various client devices 16, such as monitoring devices 18 and sensors 20, are wirelessly networked to a base station or high frequency hub 24 which, in turn, communicates with the WAN 14 via a gateway hub, shown as gateway router 28. Base station hub 24 includes a processor 24a for providing internal computing capabilities, as hereinafter described. Base station hub 24 and router 28 provide a high frequency connection to WAN 14. Base station hub 24 may be eliminated as a stand-alone module if its functionality is incorporated into gateway router 28, in which case gateway router 28 also serves as a base station hub. The system may also include a security hub 26 that communicates with monitoring device(s) 18 and with the WAN 14 and provides a low frequency connection between the WAN 14 and monitoring devices 18. If present, security hub 26 may also communicate with the router or hub 28, such as through a high frequency connection path 52 and/or a low frequency connection 54 path to the router 28. The security hub 26 is also provided with a processor 26a for providing internal computing capabilities, as hereinafter described, and has the capability of providing a high frequency connection with monitoring devices 18. A public key for encrypting data transmitted by base station hub 24 and/or security hub 26 may be saved thereon, for reasons hereinafter described. As is known, a public key is a cryptographic key comprising a mathematical algorithm implemented in software (or hardware) that may be used to encrypt data. The public key is a string of bits that are combined with the data using an encryption algorithm to create ciphertext, which is unreadable. In order to decrypt the encrypted data, a private key must be used. As is known, a private key is a cryptographic key comprising a mathematical algorithm implemented in software (or hardware) that may be used to decrypt data encrypted utilizing a public key. The private key decrypts the encrypted data back to plaintext, which is readable. The private key is saved in a memory in one or more of the user devices 44 as explained in more detail below.

Still referring to FIG. 1, gateway router 28 is typically implemented as a WIFI hub that communicatively connects WLAN 12 to WAN 14 through an internet provider 30. Internet provider 30 includes hardware or system components or features such as last-mile connection(s), cloud interconnections, DSL (digital subscriber line), cable, and/or fiber-optics. As mentioned, the functionality of the base station hub 24 also could be incorporated into router 28, in which case router 28 becomes the base station hub, as well as, the router. Another connection between WLAN 12 and WAN 14 may be provided between security hub 26 and mobile provider 32. Mobile provider 32 includes hardware or system components or features to implement various cellular communications protocols such as 3G, 4G, LTE (long term evolution), 5G, or other cellular standard(s). Besides the mobile connection, security hub 26 typically also is configured to connect to WAN 14 by way of its connection to router hub 28 and the router hub's connection to WAN 14 through internet provider 30. Each of the internet provider 30 and mobile provider 32 allows the components of system 10 to interact with a backend system or control services that can control functions or provide various processing tasks of components of system 10, shown as a cloud-based backend control service system 34, which could be an Arlo SmartCloud™ system. The backend system, such as the cloud-based control service system 34, includes at least one server 36 and typically provides, for example, cloud storage of events, AI (artificial intelligence) based processing such as computer vision, and system access to emergency services. The public key may also saved in computer-readable memory associated with cloud-based control service system 34, for reasons hereinafter described.

As noted above, electronic monitoring system 10 typically includes multiple monitoring devices 18 that are mounted to face toward respective areas being monitored, such as around a building or other structure or area. It is intended for monitoring devices 18 to perform a variety of monitoring, sensing, and communicating functions. Each monitoring device 18 includes a firmware image stored in non-volatile memory thereon. As is conventional, the firmware image acts as the monitoring device's complete operating system, performing all control, monitoring and data manipulation functions. In addition, the public key may also saved in computer-readable memory associated with each monitoring device 18, for reasons hereinafter described.

Figure 2:
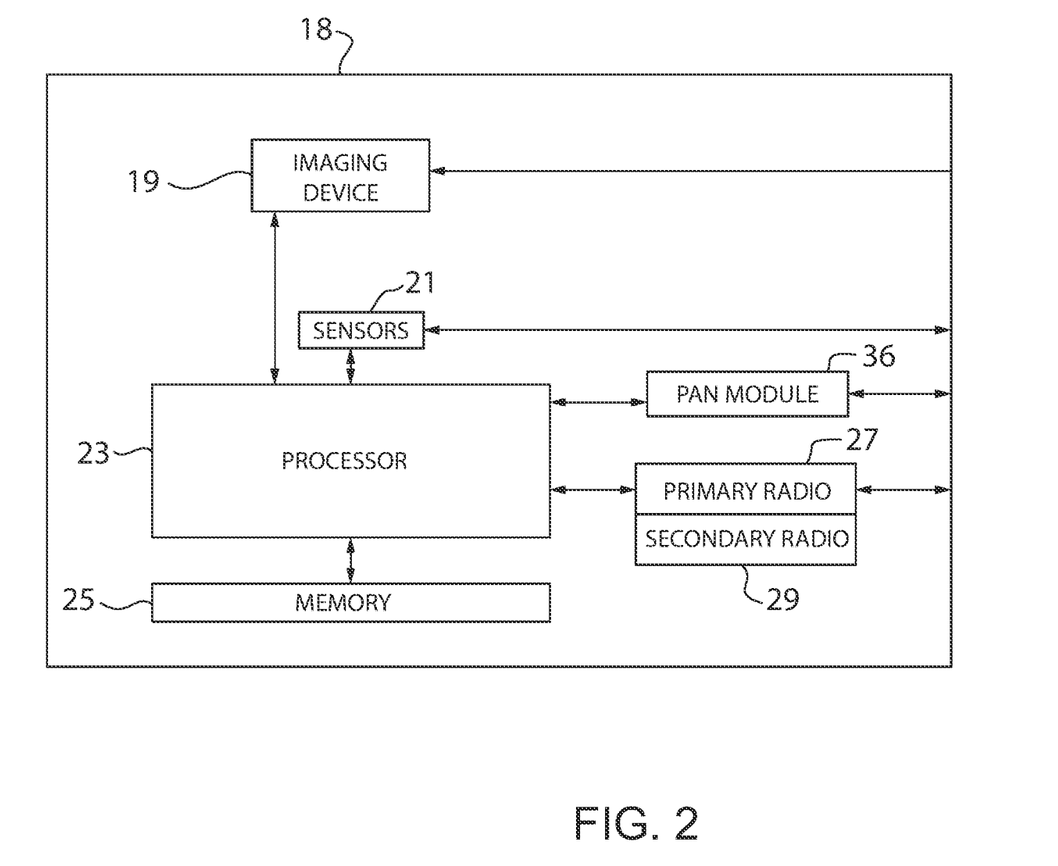
FIG. 2 schematically illustrates the internal circuitry of one the monitoring devices of the system of FIG. 1.

Referring to FIG. 2, by way of example, one such monitoring device 18 may include an imaging device 19, such as a smart camera, that is configured to capture, store and transmit visual images and/or audio of the monitored area within the environment, e.g., an Arlo® camera available from Arlo Technologies, Inc. of Carlsbad, California. In addition to containing a security camera, the monitoring device 18 may also include a one or more sensors configured to detect one or more types of conditions or stimulus, for example, motion, opening or closing events of doors or windows, the presence of smoke, carbon monoxide, water leaks, and temperature changes. Instead of or in addition to containing sensors, monitoring device 18 may have audio device(s) such as microphones, sound sensors, and speakers configured for audio communication or providing audible alerts. Other types of monitoring devices 18 may have some combination of sensors 20 and/or audio devices without having imaging capability. One such device is Arlo Chime™, which has only audio capabilities. Sensors 20 or other monitoring devices 18 also may be incorporated into form factors of other house or building accessories, such as doorbells, floodlights, etc.

Each monitoring device 18 includes circuitry, a main processor 23 and/or an image signal processor, and computer-readable memory 25 associated therewith. It is further contemplated to store the public key in computer-readable memory associated with each monitoring device 18, for reasons hereinafter described. The circuitry, the main processor 23, the computer-readable memory 25 and the public key are configured to allow the monitoring device to perform a variety of tasks including, but not limited to, capturing a video image with the smart camera and the metadata associated with the image (e.g. the time and date that image was captured); encrypting each frame of video image using the public key; processing the captured video image to generate an enhanced video image from the encrypted frames of the video image; controlling the acquisition and transmission of data; and transmitting an enhanced media stream to a respective hub 24 and/or 26 for further processing and/or further transmission to a server, such as the server 36 of the cloud-based control service system 34, and/or communication with user device(s) 44. It can be appreciated that the main processor 23 and/or the image signal processor may perform additional tasks without deviating from the scope of the present invention. For example, the image signal processor can toggle between: 1) a low power mode in which the image signal processor performs only essential tasks to insure proper operation of the smart camera, thereby minimizing the electrical power drawn from a battery used to power a corresponding monitoring device 18; and 2) an operation mode, in which the image signal processor is awake and capable of performing all programmed tasks.

Monitoring devices 18 of system 10 may also include various other device(s) and/or systems that perform functions other than monitory. Such devices include smart home devices such as HVAC control systems and components. They also could include one-touch type communication devices such as panic buttons and other communication buttons. One such button is marketed under Arlo Technologies, Inc. under the brand name ARLO SAFE™. All of these devices and systems can be considered "monitoring devices" for purposes of the present discussion. Devices that communicate using LE protocols such as Bluetooth® can be considered "LE devices". Devices that communicate with Bluetooth® Low Energy, are considered "BLE devices", including the "BLE Button".

In order to allow for low and high frequency communication on WLAN 12, it is contemplated for monitoring devices 18 to have two radios operating at different frequencies. Referring again to FIG. 2, a first, "primary" radio 27 operates at a first frequency, typically at a relatively high frequency, typically of 2.4 GHz to 5 GHZ, during period of normal conductivity to perform monitoring and data capture functions such as video capture and transmission, sound transmission, motion sensing, etc. The second or "secondary radio" 29 operates at a second frequency that is immune or at least resistant to resistance from signals that typically jam signals over the first frequency. The second frequency may be of considerably lower frequency in the sub-GHz or even RF range and may have a longer range than the primary radio. It is intended for the secondary radio to be operable, when communications over the primary communication path are disrupted, in order to permit the continued operation of monitoring devices 18, as well as, to permit transmit and display information regarding the communications disruption to be transmitted and displayed for a user. The term "disruption," as used herein, applies equally to an initial failure to connect over the primary communication path upon device startup and a cessation or break in connection after an initial successful connection. In addition, it is contemplated for each monitoring device 18 to include Bluetooth® or any PAN communications module 36 designated for wireless communication. As is known, modules 36 allows monitoring devices 18 to communicate directly with one or more user devices 44 over a wireless Personal Area Network (PAN) 38. Likewise, sensors 20 may include Bluetooth® or any PAN communications module 45 to allow sensor 20 to communicate directly with one or more user devices 44 over a wireless Personal Area Network (PAN) 38, FIG. 1.

Figure 3:
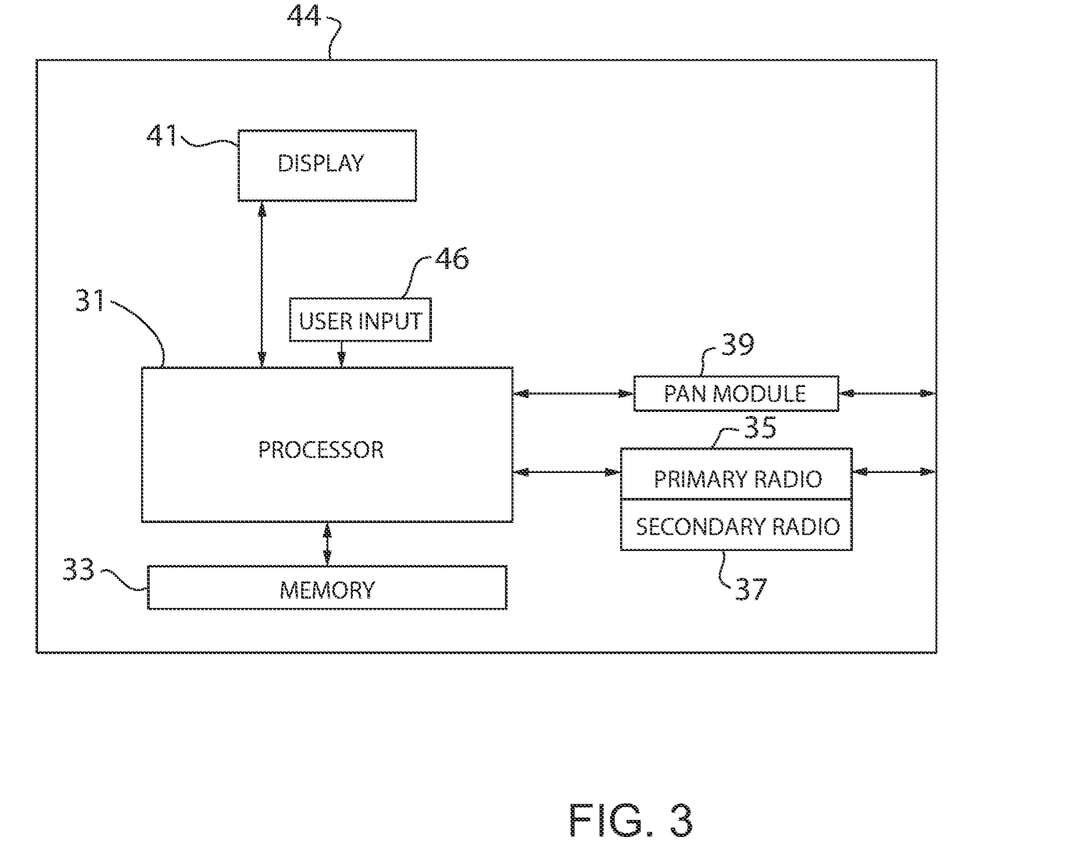
FIG. 3 schematically illustrates the internal circuitry of one of the user devices of the system of FIG. 1.

Referring to FIGS. 1 and 3, one or more user devices 44, such as a smart phone, tablet, laptop, or PC, may communicate with various components of electronic monitoring system 10. It can be understood that user devices 44 may communicate with the various components of electronic monitoring system 10 utilizing WLAN 12, WAN 14 and/or PAN 38 via primary radio 35, secondary radio 37 and PAN communications module 39, respectively, to provide an interface through which a user may interact with electronic monitoring system 10, including client devices 16. Each user device 44 includes a display system that typically includes both an audio display and a video display such as a touchscreen. Referring to FIG. 3, each user device 44 also has a processor 31 to allow for internal computing capabilities, computer-readable memory 33 and a program or application, such as the Arlo Smart application, serving as the user interface with the remainder of system 10. Each user device 44 includes at least one actuatable user input 46, such as all or a portion of a touch screen 41 as shown FIGS. 1 and 3, a keypad, and/or a microphone. In response to the information provided on the display of the one or more user devices 44, a user may actuate the at least one actuatable user input 46 to address the information. A private key, used to decrypt data encrypted utilizing the public key and received by user device 44, is stored in the computer-readable memory associated with user device 44, for reasons hereinafter described.

Referring back to FIG. 1, within WLAN 12, multiple communication paths 50 are defined that transmit data between the various components of system 10. Communication paths 50 include a default or primary communication path 52 providing communication between monitoring device 18 and the base station hub 26, and a fail-over or fallback secondary communication path 54 providing communication between monitoring device 18 and the security hub 26. Optionally, some of the monitoring devices 18 that do not require high bandwidth to operate may only communicate through the secondary communication path 54, such as sensors 20 shown in FIG. 1. Thus, even during a failure of the primary communication path 52, sensors 20 will continue to operate normally. A collective area in which device communication can occur through the primary communication path 52 defines a primary coverage zone. A second, typically extended, collective area in which the device communication can occur through the secondary communication path 54 defines a secondary coverage zone. A wired communication path 56 is shown between the router 28 and the internet provider 30, and a cellular communication path 58 is shown between security hub 26 and mobile provider 32. WAN 14 typically includes various wireless connections between or within the various systems or components, even though only wired connections 56 are shown. If the security hub 26 and the associated secondary communication path 54 are not present, the sensors 20 may communicate directly with the base station hub 24 (if present, or the router 28 if the functionality of the base station hub is incorporated into the router) via the primary communication path 52.

As described, electronic monitoring system 10 is configured to implement a seamless OTA communication environment for each client device 16 by implementing a communication path switching strategy as a function of the operational state of primary and/or secondary communication paths, as heretofore described. For example, each monitoring device 18 is configured to acquire data and to transmit it to a respective hub 24 and/or 26 for further processing and/or further transmission to a server such as the server 36 of the cloud-based control service system 34 and/or the user device(s) 44. The server 36 or other computing components of system 10 or otherwise in the WLAN 12 or WAN 14 can include or be coupled to a microprocessor, a microcontroller or other programmable logic element (individually and collectively considered "a controller") configured to execute a program. The controller also may be contained in whole in the monitoring device 18, base station hub 24, security hub 26, and/or the WIFI hub or router 28. Alternatively, interconnected aspects of the controller and the programs executed by it could be distributed in various permutations within the monitoring device 18, the hubs 24 and 26, router 28, and the server 36. This program may be utilized in filtering, processing, categorizing, storing, recalling and transmitting data received from the monitoring device 18 via the hubs 24 and 26, router 28, and server 36. Server 36 or other appropriate system device may also be in communication with or include a computer vision program ("CV"), which can apply one or more filters or processes, such as edge detection, facial recognition, motion detection, etc., to detected one or more characteristics of the recording such as, but not limited to, identifying an individual, animal, vehicle, or package present in the recording.

Figure 4A:
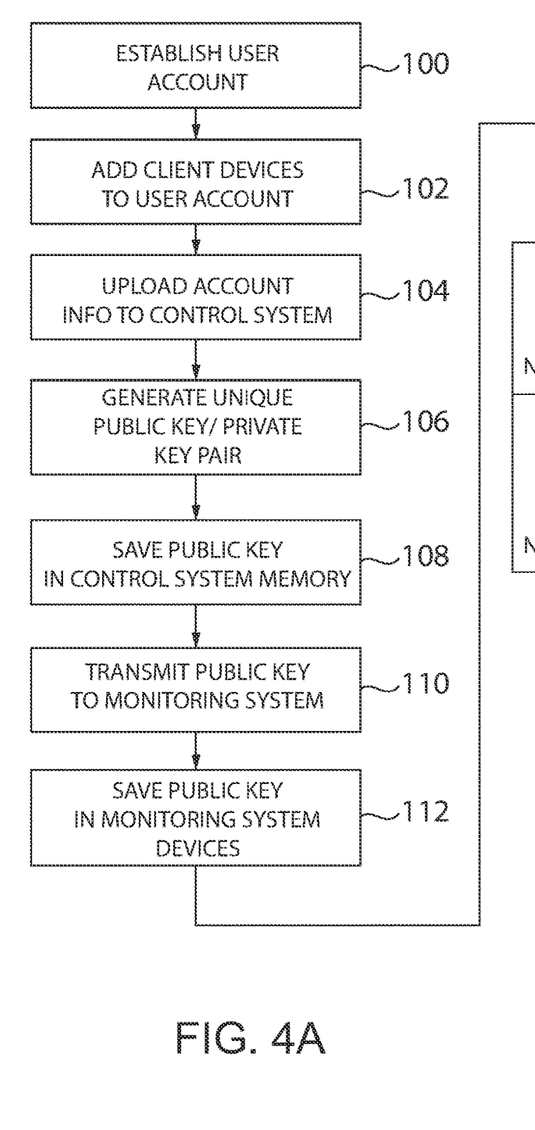
FIGS. 4A-4E collectively form a is a flowchart showing the steps in the methodology of the present invention.

Referring to FIG. 4a, in order to set up the electronic monitoring system 10 of the present embodiment, a user establishes an account with a service provider, e.g. Arlo, through the service provider's webpage or using the service provider's application on user device 44, block 100. In the account, a user may add or onboard various client devices 16, such as monitoring devices 18 and sensors 20, to the electronic monitoring system 10 associated with the user's account by utilizing, for example, a pre-populated list of devices and simply following a series of on-screen instructions, block 102. Once the various client devices 16 are added to the user's electronic monitoring system 10 and the information is uploaded to cloud-based control service system 34, cloud-based control service system 34 generates a unique public key/private key pair for the user's electronic monitoring system 10, block 104. The public key is saved in the computer-readable memory associated with cloud-based backend control service system 34, block 108, and transmitted to base station hub 24 and the various client devices 16, such as monitoring devices 18 and sensors 20, block 110. The public key then is saved in computer-readable memory 25 associated with noted devices, block 112. In addition, the private key is uploaded to the service provider's application on user device 44 and saved therein in the computer-readable memory 33 of user device 44, block 114.

In operation, with client devices 16 integrated into electronic monitoring system 10, data packets corresponding to notifications, sounds, images, captured frames, and/or video clips captured may be generated by a corresponding client device 16 continuously, in response to instructions from user device 44, or in response to detection of a triggering event. More specifically, each client device 16 is configured, though suitable mounting of the client device 16 and/or through suitable manipulation of its controls, to monitor an area of interest, such as a part of a building or a section of a property, block 116. For example, the security camera may continuously monitor the area of interest, monitor the area of interest in response to instructions from user device 44, or capture an images and sounds upon receipt of a command from monitoring device 18, block 118. Thumbnails or video frames of the image and/or sounds may also be captured automatically, in response to a command or instructions from user device 44, or upon detection of a triggering event detected by a detector, which may be incorporated into client device 16 and/or monitoring device 18, or be a standalone detector in communication with client device 16, monitoring device 18 and/or a respective hub 24 or 26. The triggering event may be motion of a triggering object, and the detector may be a motion detector. Instead of or in addition to detecting motion, the detector could include an IR sensor detecting heat, such as the body heat of an animal or person. The triggering event also could be sound, in which case the detector may include a microphone. In this case, the triggering event may be a sound exceeding a designated decibel level or some other identifiable threshold. It is also possible to limit triggering events to detection of a certain class of object, such as an automobile, a person, a package, or an animal. Detection of other types of objects would not trigger image capture and recording. It can be understood that evaluation of the event to determine if the event detected rises to the level of a triggering event may be conducted at client device 16 and/or monitoring device 18. Alternatively, a data packet comprising the data associated with the event may be transmitted to a respective hub 24 or 26 or server 36 of cloud-based control service system 36, in a manner hereinafter described, for evaluation, block 120.

Figure 4B:
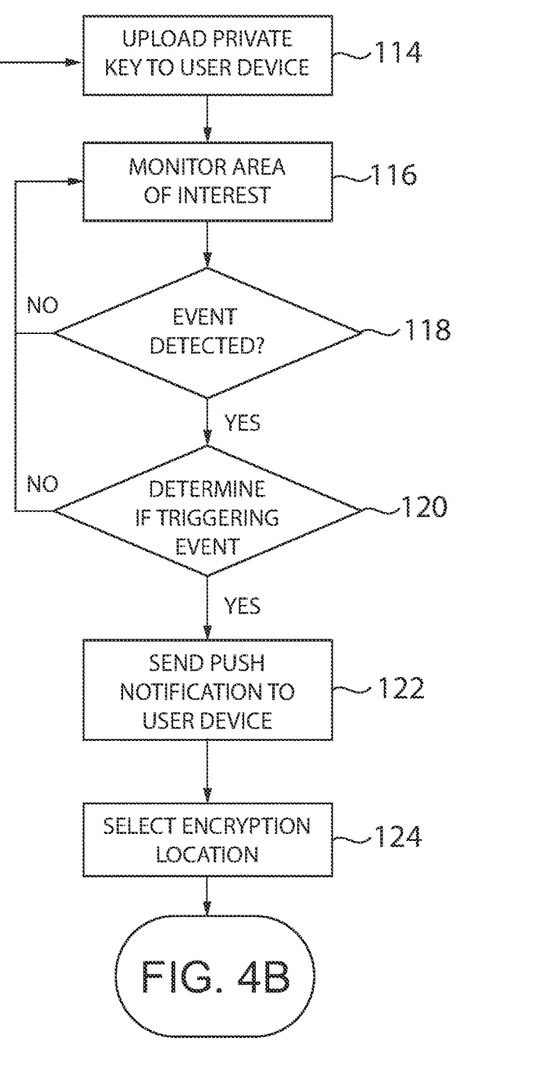

Upon a determination of a triggering event by client device 16, electronic monitoring system 10 generates a push notification ("PN") or other alert or notification and send it to one or more user devices 44 to advise the user of the triggering event, block 122. Further, the location at which the data packets corresponding to the triggering event are to be encrypted is determined, block 124, FIG. 4b. This may be an automatic determination or pre-selected by a user. By way of example, the data packet comprising the data associated with the event triggering the PN may be encrypted by client device 16 using the public key and transmitted to user device 44. If the triggering event constitutes an image and sounds captured by the security camera upon receipt of a command from monitoring device 18, processor 23 of monitoring device 18 may encrypt the thumbnails or key video frames of the images using the public key, block 126. Thereafter, the encrypted video frames and associated metadata are transmitted by monitoring device 18, as heretofore described, to a respective hub 24 and/or 26 for further processing and/or further transmission to server 36 of the cloud-based control service system 34 for further processing and/or storage, block 128 and block 150, FIG. 4c.

Figures 4B, 4C:
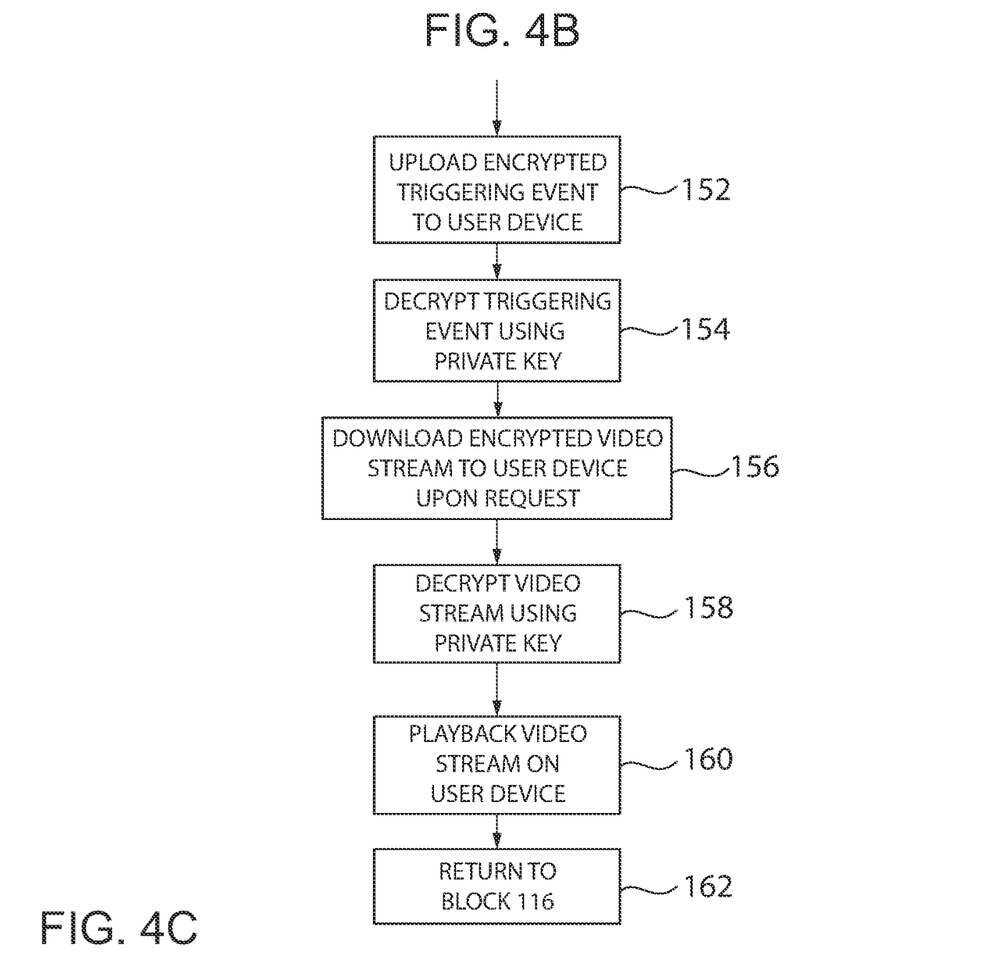

In addition, whether the security camera operation is continuously monitor the area of interest, monitoring the area of interest in response to a command or instruction from user device 44, is triggered by a command from monitoring device 18 or by detection of a triggering event by a detector, block 128 and block 150, FIG. 4c, monitoring device 18 will compile the video frames to create a video stream or event video, which may include corresponding audio, block 130. The video stream is also encrypted by processor 23 of monitoring device 18 using the public key, and the encrypted, enhanced video stream then is transmitted by monitoring device 18, as heretofore described, to a respective hub 24 and/or 26 for further processing and/or further transmission to server 36 of the cloud-based control service system 34 for further processing and/or storage, block 132 and block 150, FIG. 4c.

Alternatively, monitoring device 18 may transmit the video frames captured by the security camera and the associated metadata directly to a respective hub 24 and/or 26, at which point the thumbnails or key video frames of the image and/or sounds may be automatically analyzed by a corresponding processor 24a and 26a, respectively, to detect a triggering event, as heretofore described. Upon detection of a triggering event, electronic monitoring system 10 generates a PN or other alert or notification and sends it to user device 44 indicating the triggering event, block 134. In addition, thumbnails or key video frames are encrypted by the corresponding processor 24a and 26a, respectively, using the public key, block 136. The encrypted video frames and associated metadata are transmitted by the respective hub 24 and/or 26 to server 36 of the cloud-based control service system 34 for further processing and/or storage, block 138 and block 150, FIG. 4c.

In addition, the video frames are compiled by the corresponding processor 24a and 26a, respectively, to create a video stream or event video, which may include corresponding audio, block 140. The video stream is encrypted by the corresponding processor 24a and 26a, respectively, using the public key and the encrypted, enhanced video stream is transmitted by the respective hub 24 and/or 26 to server 36 of the cloud-based control service system 34 for further processing and/or storage, block 142 and block 150, FIG. 4c.

In a still further alternative, monitoring device 18 may transmit the video frames captured by the security camera and associated metadata directly to a respective hub 24 and/or 26 which, in turn, may transmit the video frames and associated metadata to server 36 of the cloud-based control service system 34, block 144, at which point thumbnails or key video frames of the image and/or sounds are automatically analyzed by server 36 to detect a triggering event, as heretofore described. Upon detection of a triggering event, cloud-based control service system 34 generates a PN or other alert or notification and sends it to user device 44 for indicating the triggering event. In addition, the thumbnails or key video frames are encrypted by server 36 using the public key, block 146, and stored along with their associated metadata on the computer-readable memory associated with cloud-based control service system 34 for further processing and/or further transmission, block 150. Further, the video frames are compiled by server 36 to create a video stream or event video, which may include corresponding audio, block 148. The video stream is encrypted using the public key and stored on the computer-readable memory associated with cloud-based control service system 34 for further processing and/or further transmission, block 152, FIG. 4c.

Access of the application on the user device 44 in response to receipt of a PN or other alert or notification indicating the triggering event causes the server 36 of the cloud-based control service system 34 to upload the encrypted video frames to user device 44, block 152. Processor 31 of user device 44 decrypts the encrypted video frames received from server 36 of the cloud-based control service system 34 utilizing the private key stored in the computer readable memory 33 of user device 44, thereby allowing the thumbnails or decrypted video frames, along with the associated metadata, to be displayed on the display system 41 of the user device 44, block 154.

Upon its selection by a user, e.g. by actuating user input 46 or tapping on a displayed, decrypted video frame, the encrypted video stream is downloaded from server 36 of the cloud-based control service system 34, block 156, and is decrypted by processor 31 utilizing the private key, as heretofore described, block 158. The decrypted video stream is then played back on the display system 41 of the user device 44, block 160. It can be appreciated that at any point during or after detection of a possible triggering event, electronic monitoring system 10 may return to step of monitoring the desired area of interest to detect a subsequent possible triggering event, block 162.

Figure 4D:
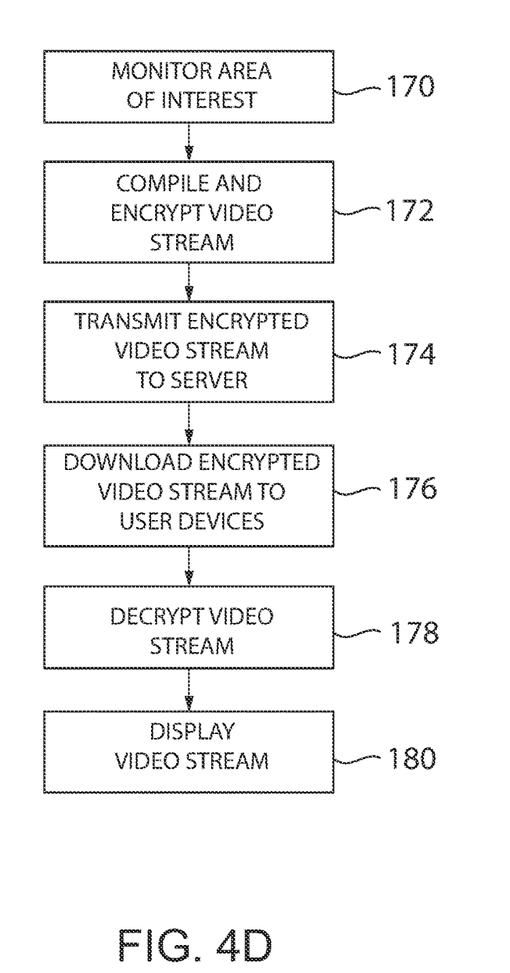

Referring to FIG. 4d, if the security camera operation is continuously monitoring the area of interest, and thus not responsive to a triggering event captured by a detector, block 170, monitoring device 18 may compile the video frames captured by the security camera to create a video stream or event video, which may include corresponding audio. The video stream is encrypted by processor 23 of monitoring device 18 using the public key, block 172, and the encrypted, enhanced video stream then is transmitted by monitoring device 18, as heretofore described, to a respective hub 24 and/or 26 for further processing and/or further transmission to server 36 of the cloud-based control service system 34 for further processing and/or storage, block 174.

In the event, a user chooses to view all or a portion of the video stream of the area of interest, the user may utilize user input 46 of user device 44 to selectively download all or a portion of the encrypted video stream from server 36 of the cloud-based control service system 34, block 176. For example, a user may select a portion of the video stream corresponding to a specific time and date. Upon receipt of the encrypted video stream from server 36 of the cloud-based control service system 34 by user device 44, the encrypted video stream is decrypted by processor 31 utilizing the private key, as heretofore described, block 178. The decrypted video stream is then played back on the display system 41 of the user device 44, block 180.

Figure 4E:
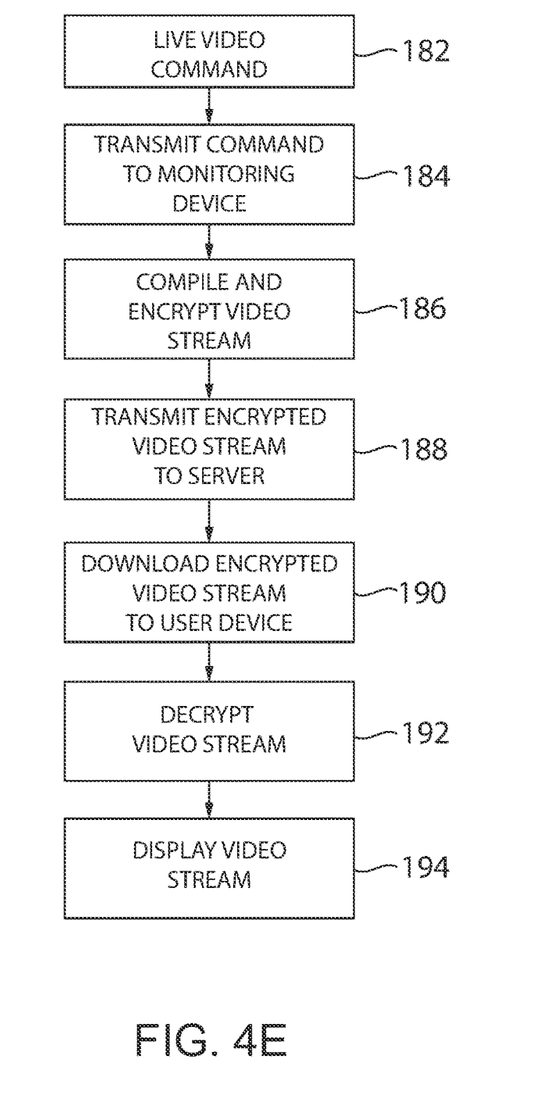

Referring to FIG. 4e, in the event a user wishes to view a live video stream of the area of interest, a user may utilize user input 46 of user device 44 to selectively send a corresponding command to server 36 of the cloud-based control service system 34, block 182. In response, cloud-based control service system 34 transmits the command to base station hub 24 and the various client devices 16, such as monitoring devices 18 and sensors 20, block 184. Monitoring device 18 will then compile the video frames from the live image taken by the security camera of the area of interest to create a video stream or event video, which may include corresponding audio. The video stream is encrypted by processor 23 of monitoring device 18 using the public key, block 186, and the encrypted, enhanced video stream then is transmitted by monitoring device 18, as heretofore described, to a respective hub 24 and/or 26 for further processing and/or further transmission to server 36 of the cloud-based control service system 34 for further processing and/or storage, block 188. In addition, server 36 of the cloud-based control service system 34 immediately downloads the encrypted, enhanced video stream to user device 44, block 190. Upon receipt of the encrypted video stream from server 36 of the cloud-based control service system 34 by user device 44, the encrypted video stream is decrypted by processor 31 utilizing the private key, as heretofore described, block 192. The decrypted video stream is then played on the display system 41 of the user device 44, block 194.

It can be appreciated that the asymmetrical encryption method heretofore described provides significant security to the transmission of the data packets to user devices 44. However, due to the complexity of the mathematics involved in the encryption and decryption of data packets, asymmetrical encryption requires more computing time (a critical factor when transmitting large data packets) and is relatively slow when compared to symmetrical encryption methods. As such, it is contemplated to use both symmetrical and asymmetrical encryption in combination to encrypt the data packets. More specifically, once the various client devices 16 are added to the user's electronic monitoring system 10 and the information is uploaded to cloud-based control service system 34, as heretofore described, cloud-based control service system 34 generates both a symmetric key and a unique public key/private key pair for the user's electronic monitoring system 10, block 104. The symmetric key and the public key are saved in the computer-readable memory associated with cloud-based backend control service system 34, block 108, and transmitted to base station hub 24 and the various client devices 16, such as monitoring devices 18 and sensors 20. The symmetric key and the public key then are saved in computer-readable memory 25 associated with noted devices. In addition, the symmetric key and the private key are uploaded to the service provider's application on user device 44 and saved therein in the computer-readable memory 33 of user device 44.

In order to encrypt data packets corresponding to notifications, sounds, images, captured frames, and/or video clips captured, as heretofore described, it is contemplated the data packet be first encrypted, e.g. by processor 23 of monitoring device 18 using the symmetric key, and thereafter, encrypt the symmetric key encrypted data packet with the public key. When the encrypted data packet is received by user device 44, processor first decrypts the data packet utilizing the private key (resulting in the symmetric key encrypted data packet), and thereafter, decrypting the symmetric key encrypted data packet with the symmetric key. The decrypted data packet may then be broadcast by user device 44. It can be appreciated that encrypting the actual data packet with the faster symmetrical method speeds up the encryption process, while encrypting the symmetric key encrypted data packet via the higher security, asymmetrical, encryption method protects transmission of the data packets between the various components of electronic monitoring system 10.

It can be appreciated that in accordance with the methodology of the present invention, the data packets corresponding to sounds, images, captured frames, and/or video clips captured by client devices 16 and/or monitoring devices 18 of electronic monitoring system 10 associated with a user's account can only be observed/viewed on user device 44 by a user logged into their account with the service provider through the service provider's webpage or using the service provider's application. In the event a user has multiple user devices 44a and 44b, it is contemplated for the user to securely transmit the private key onto the service provider's application on an alternate user device 44b. Further, if the user wishes to have others, e.g. family and friends, to have access to the sounds, images, captured frames, and/or video clips captured by client devices 16 and monitoring devices 18 of electronic monitoring system 10 associated with a user's account, it can be understood that a user may link client devices 16 and monitoring devices 18 of electronic monitoring system 10 associated with a user's account with an alternate user's account and securely transmit the private key onto the service provider's application on the alternate user's user device 44*b*. With the private key stored on the alternate user's device 44*b*, the alternate user may decrypt and have access to the sounds, images, captured frames, and/or video clips captured by client devices 16 and monitoring devices 18 of electronic monitoring system 10 associated with the primary user's account. the sounds, images, captured frames, and/or video clips captured by client devices 16 and monitoring devices 18 of electronic monitoring system 10 associated with a user's account.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

It should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

I claim:

1. An electronic monitoring system, comprising:
   a monitor for monitoring an activity within an activity zone, the monitor being configured to generate a data packet corresponding to the activity;
   an encryption processor in communication with the monitor and being configured to encrypt the data packet using a public key;
   a cloud-based server including a computer-readable memory for storing the encrypted data packet; and
   a user device communicable with the monitor and the cloud-based server, the user device including:
      a private key stored thereon;
      a decryption processor configured to receive the encrypted data packet from the cloud-based server and to decrypt the encrypted data packet using the private key;
   wherein:
      the monitor configured to transmits an alert signal to the user device in response to activity monitored within the activity zone; and wherein
      the cloud-based server is configured to transmit the encrypted data packet to the user device in response to receipt of a request transmitted from the user device.

2. The electronic monitoring system of claim 1, wherein the monitor is a detector for detecting the activity in the activity zone, the detector generating the data packet in response to detection of the activity in the activity zone.

3. The electronic monitoring system of claim 2, wherein the detector includes an imaging device having a field of view in the activity zone and being configured to capture an image of the field of view in response to the activity detected, the image comprised of a plurality of frames defining the data packet.

4. The electronic monitoring system of claim 3, wherein the data packet is a first data packet and each frame of the plurality of frames of the image defines a corresponding data packet so as to define a plurality of data packets.

5. The electronic monitoring system of claim 3, wherein the plurality of the frames defines an event video and wherein the encryption processor is configured to encrypt the event video using the public key.

6. The electronic monitoring system of claim 1, wherein the user device is a first user device and the decryption processor is a first decryption processor, and further comprising a second user device including:
   the private key stored thereon;
   a second decryption processor configured to receive the encrypted data packet from the computer-readable memory and to decrypt the encrypted data packet using the private key;
   wherein the cloud-based server is configured to transmit the encrypted data packet to the second user device in response to receipt of a request transmitted from the second user device.

7. An electronic monitoring system, comprising:
   a monitor for monitoring an activity within an activity zone, the monitor being configured to generate a data packet corresponding to the activity;
   a cloud-based control system;
   a hub communicable with the monitor and the cloud-based control system, the hub being configured to receive the data packet from the monitor and to transmit the data packet to the cloud-based control system;
   an encryption processor configured to encrypt the data packet using a public key;
   a computer-readable memory associated with the cloud-based control system, the computer-readable memory configured to store the encrypted data packet; and
   a user device communicable with the monitor and the cloud-based control system and adapted to receive the encrypted data packet, the user device including:
      a private key; and
      a decryption processor configured to decrypt the encrypted data packet using the private key;
   wherein:
      the monitor is configured to transmit an alert signal to the user device in response to activity monitored within the activity zone; and
      the cloud-based control system is configured to transmit the encrypted data packet to the user device in response to receipt of a request transmitted from the user device.

8. The electronic monitoring system of claim 7, wherein the monitor is a detector for detecting the activity in the activity zone, the detector generating the data packet in response to detection of the activity in the activity zone.

9. The electronic monitoring system of claim 8, wherein the detector includes an imaging device having a field of view in the activity zone and being configured to capture an image of the field of view in response to the activity detected, the image comprised of a plurality of frames defining the data packet.

10. The electronic monitoring system of claim 9, wherein the data packet is a first data packet and each frame of the plurality of frames of the image defines a corresponding data packet so as to define a plurality of data packets.

11. The electronic monitoring system of claim 9, wherein the plurality of the frames defines an event video, and wherein the encryption processor is configured to encrypt the event video using the public key.

12. The electronic monitoring system of claim 7, wherein the user device is a first user device and the decryption processor is a first decryption processor, and further comprising a second user device including:
- the private key;
- a second decryption processor configured to receive the encrypted data packet from the computer-readable memory and to decrypt the encrypted data packet using the private key;
- wherein the cloud-based control system is configured to transmit the encrypted data packet to the second user device in response to receipt of a request transmitted from the second user device.

13. A method of monitoring an activity zone, comprising the steps of:
- monitoring for an activity within an activity zone and generating a data packet corresponding to the activity;
- transmitting the data packet to a control system;
- storing the data packet in computer-readable memory associated with the control system, the data packet being encrypted utilizing a public key prior to storage in computer-readable memory;
- transmitting the encrypted data packet to one of a plurality of user devices in response to a request from the one of the plurality of user devices; and
- decrypting the encrypted data packet on the one of the plurality of user devices using a private key.

14. The method of claim 13, wherein the data packet is generated in response to detection of the activity in the activity zone and further comprising the additional steps of:
- generating an alert signal in response to detection of the activity within the activity zone; and
- transmitting the alert signal to the one of the plurality of user devices.

15. The method of claim 13, wherein:
- the activity is monitored by an imaging device having a field of view in the activity zone;
- the imaging device is configured to capture an image of the field of view in response to the activity detected; and
- the image is comprised of a plurality of frames defining the data packet.

16. The method of claim 15, wherein the data packet is a first data packet and each frame of the plurality of frames of the image defines a corresponding data packet so as to define a plurality of data packets.

17. The method of claim 15, wherein the plurality of the frames defines an event video and wherein the encryption processor is configured to encrypt the event video using the public key.

* * * * *